(12) United States Patent
Niermann et al.

(10) Patent No.: US 11,530,719 B2
(45) Date of Patent: Dec. 20, 2022

(54) PLASTICS SLIDING ELEMENT WITH SENSOR FUNCTION, IN PARTICULAR WITH WEAR DETECTION

(71) Applicant: IGUS GMBH, Cologne (DE)

(72) Inventors: Stefan Niermann, Ratingen (DE); Stefan Loockmann-Rittich, Langerwehe-Pier (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 17/283,387

(22) PCT Filed: Oct. 8, 2019

(86) PCT No.: PCT/EP2019/077257
§ 371 (c)(1),
(2) Date: Apr. 7, 2021

(87) PCT Pub. No.: WO2020/074536
PCT Pub. Date: Apr. 16, 2020

(65) Prior Publication Data
US 2021/0381550 A1  Dec. 9, 2021

(30) Foreign Application Priority Data

Oct. 8, 2018 (DE) .................... 20 2018 105 755.3
Mar. 28, 2019 (DE) .................... 20 2019 101 776.7

(51) Int. Cl.
*F16C 17/24* (2006.01)
*F16C 29/02* (2006.01)
(Continued)

(52) U.S. Cl.
CPC ............ *F16C 17/246* (2013.01); *F16C 29/02* (2013.01); *F16C 41/002* (2013.01);
(Continued)

(58) Field of Classification Search
CPC ...... F16C 17/24; F16C 17/246; F16C 29/008; F16C 29/02; F16C 29/025; F16C 41/00;
(Continued)

(56) References Cited

U.S. PATENT DOCUMENTS 5,701,119 A * 12/1997 Jurras, III ............. F16C 17/246
340/682
6,169,605 B1   1/2001 Penn et al.
(Continued)

FOREIGN PATENT DOCUMENTS

DE        69313756      9/1997
DE       102008052416   4/2010
(Continued)

OTHER PUBLICATIONS

International Search Report from corresponding PCT Appln. No. PCT/EP2019/077257, dated Jan. 10, 2020.
(Continued)

*Primary Examiner* — James Pilkington
(74) *Attorney, Agent, or Firm* — Grossman, Tucker, Perreault & Pfleger, PLLC

(57) ABSTRACT

A plastic sliding component for mounting without lubricant in a sliding bearing is proposed, having a moulded part which is manufactured from plastic and has a sliding face for movably guiding two bearing parts relative to one another. An electric function circuit with a sensor function for acquiring an operating parameter is arranged on the moulded part. The invention proposes that the function circuit comprises at least one conductor track structure which is formed on the moulded part as a carrier of the conductor track structure. The function circuit can preferably be applied to the prefabricated moulded part, which is made of plastic, by means of an additive fabrication method (AM method).

20 Claims, 2 Drawing Sheets

(51) Int. Cl.
*F16C 41/00* (2006.01)
*G01M 13/04* (2019.01)

(52) U.S. Cl.
CPC ........... *F16C 41/008* (2013.01); *G01M 13/04* (2013.01); *F16C 2233/00* (2013.01)

(58) Field of Classification Search
CPC ... F16C 41/002; F16C 41/008; F16C 2233/00
See application file for complete search history.

(56) References Cited

U.S. PATENT DOCUMENTS

| | | | |
|---|---|---|---|
| 6,501,382 B1 | 12/2002 | Rehfus et al. | |
| 9,791,348 B2* | 10/2017 | Carnahan | F16C 43/00 |
| 9,951,820 B2* | 4/2018 | Dowie | G01M 13/04 |
| 10,015,886 B2 | 7/2018 | Tarantino | |
| 10,690,115 B2* | 6/2020 | Murakami | F03D 80/70 |

| | | | |
|---|---|---|---|
| 2009/0223083 A1* | 9/2009 | LeCrone | F26B 13/14 384/129 |
| 2016/0208849 A1 | 7/2016 | Gorges et al. | |
| 2019/0145462 A1 | 5/2019 | Jansa et al. | |

FOREIGN PATENT DOCUMENTS

| | | |
|---|---|---|
| DE | 102013008506 | 11/2014 |
| DE | 102017106235 | 9/2018 |
| GB | 2328798 | 3/1999 |
| JP | 2015105630 | 6/2015 |
| WO | 2008146047 | 12/2008 |
| WO | 2017182662 | 10/2017 |

OTHER PUBLICATIONS

International Preliminary Report on Patentability from corresponding PCT Appln. No. PCT/EP2019/077257, dated Dec. 11, 2020.

* cited by examiner

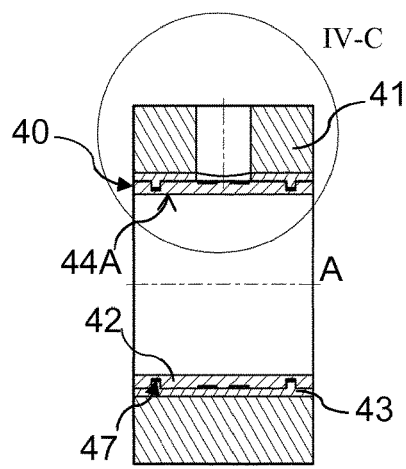 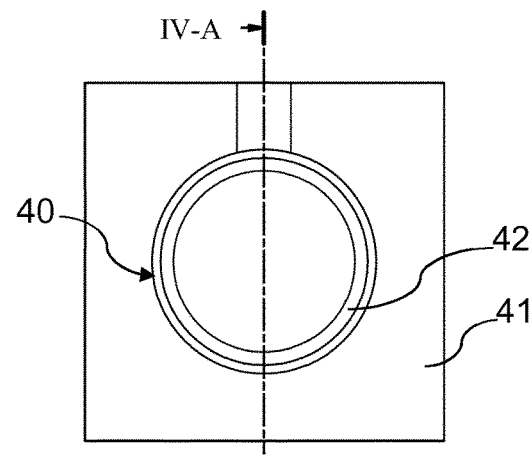
Fig.4A  Fig.4B
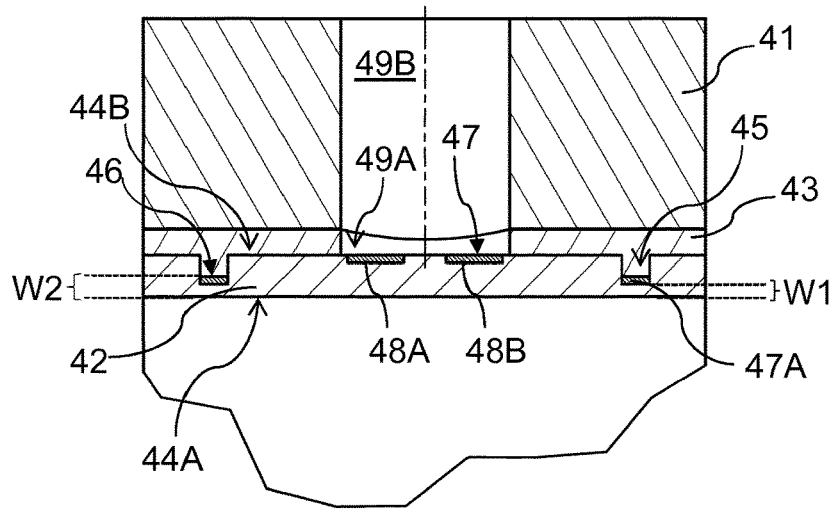
Fig.4C
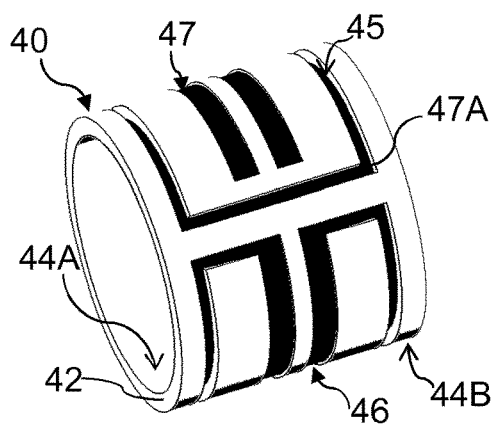 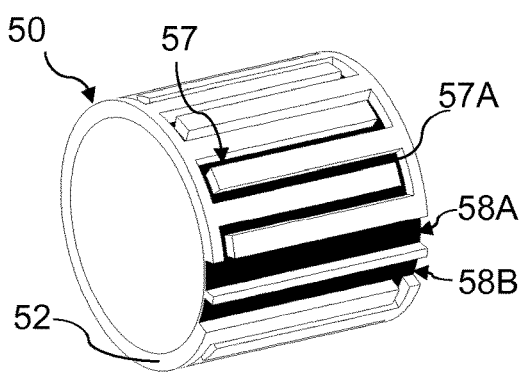
Fig.5A  Fig.5B

PLASTICS SLIDING ELEMENT WITH SENSOR FUNCTION, IN PARTICULAR WITH WEAR DETECTION

FIELD

The invention relates in general to a plastic sliding element with integral sensor function, which is suitable for use in plain bearings of any design. The invention relates in particular to a plastic sliding element for lubricant-free bearing in a plain bearing, which comprises a formed part made of plastic, in particular an injection molded part, wherein an electrical functional circuit with sensor function is arranged on the formed part. This functional circuit may serve in acquisition of an operating parameter, in particular of the sliding element itself, such as for example the detection of excessive wear for the purpose of predictive maintenance. In this respect, the sliding element has a sliding surface for plain bearing mounting and/or mobile guidance or mounting of two parts of a plain bearing relative to one another.

BACKGROUND

Such a sliding element is already known from patent application WO 2017/182662 A1 belonging to the applicant. Here, the sliding element has a functional circuit with a detector, which changes its electrical properties, for example by conductor interruption, in the event of a predetermined degree of wear in a critical region. The functional circuit makes it possible to detect the wear-induced change, in particular wirelessly using a transponder.

With regard to manufacture, it is proposed in WO 2017/182662 A1 to arrange the detector element in a recess in the sliding surface. An existing or adapted component of a film-type RFID transponder is proposed as a detector, for example. Furthermore, a separate component is proposed as detector element, which is connected with a conventional commercial RFID transponder, for example a shunt conductor. In both cases, after attachment the detector may be embedded or encapsulated in an additional process step. How precisely the functional circuit, in particular the detector, is to be produced is not however disclosed in WO 2017/182662 A1.

The combination of plastic components in complex geometries with integrated sensor system does, however cause some difficulties in practice. The integration of sensor functions into plastic sliding elements of the most varied geometries is thus in many cases really difficult.

A first object of the present invention therefore consists in proposing a plastic sliding element which, even in large numbers, may be provided inexpensively and reliably with an electrical functional circuit for detection by sensor of an operating parameter.

SUMMARY

According to the invention, it is proposed in the case of a plastic sliding element for lubricant-free bearing in a plain bearing that the functional circuit comprise at least one trace conductor pattern, which is formed on the formed part of plastic, wherein the formed part itself forms the carrier or the substrate for the trace conductor pattern. The functional circuit may in particular be applied on the formed part using an additive manufacturing method. In this case, the formed part itself is preferably, but not necessarily already prefabricated when the functional circuit is applied.

The proposed construction has the advantage, inter alia, that inexpensively producible sensor systems with the desired properties can be directly integrated into the formed parts, i.e. the degree of automation is increased or additional manufacturing steps may be omitted.

The sliding element with the formed part may in this case constitute part of the mounted bearing part or indeed of the mounting bearing part (mechanical frame), i.e. it is immaterial whether it has a mounting action or is mounted. A sliding element in the present sense serves in particular for sliding mounting of and/or on a sliding partner when fitted in a plain bearing.

The term "trace conductor" is here understood to mean an individual electrically conductive connection element. A trace is a component of any desired length but specified width and specified thickness (structural height), wherein the thickness of the trace is significantly smaller than its width, in particular by a factor of at least two, conventionally by approximately one order of magnitude. In other words, the term refers to connection elements, typically of flat construction, with geometries similar to the trace conductors conventional on printed circuit boards.

The formed part may in particular be prefabricated or already present prior to application of the trace conductor pattern or the functional circuit. In this way, the formed part may itself be used as a circuit carrier or substrate for the trace conductor pattern. Conventional printed circuit boards or PCBs are thus not necessary.

The trace conductor pattern according to the invention may be applied by different techniques, for example it may be produced by applying a conducting varnish to the prefabricated formed part and/or printed onto the formed part for example using 3D printing. The entire functional circuit, but at least the trace conductor pattern, is preferably applied, in particular printed, directly or immediately onto the prefabricated plastic part.

The functional circuit may be applied for example by an additive metallizing method onto the formed part, by applying a metal to a metallizable plastic material by electroplating, or indeed by thermal application, e.g. spraying.

The functional circuit according to the invention may in general by applied or deposited onto the formed part of plastic by an additive manufacturing method.

This may in particular proceed using a suitable MID (Molded Interconnect Device) technology, in particular an additive MID technology, which is here understood to be a preferred example of an AM method.

The functional circuit may also be attached by other suitable, per se known AM methods, in particular by a method designated as an additive manufacturing method as per standard VDI 3405 or standard DIN EN ISO 17296-2 (Part II).

AM methods allow inherently automated, computer-aided manufacture of virtually any desired complex geometry, typically based on a structure applied layer-by-layer. Further examples of particularly suitable AM methods are direct printing with automatic curing of the printing composition or indeed 3D printing by techniques such as polymerization, adhesive bonding, sintering/melting etc.

The functional circuit may in this respect be wholly or integrally produced in a cohesive additive manufacturing process, in particular without other discrete electrical components. Extrusion-based (EB) methods are in addition particularly suitable, either with chemical curing or with physical solidification of heated thermoplastic. The FDM (Fused Deposition Modeling) method is for example also suitable. MJ (Material Jetting) methods are also feasible, for example with photopolymers which solidify through exposure to light. So-called BJ (Binder Jetting) methods, sometimes also known as SDP methods, are likewise conceivable.

In addition to MID methods all so-called 3D printing techniques are in principle also suitable. EB methods are preferred, due to their suitability for relatively high-viscosity, conductive pastes.

In particular an FLM or an FFF method is here preferred for additive manufacture.

The functional circuit may however also be applied by In-Mold Labeling, or by inserting a printed film into an injection mold and back injecting with the plastic material. The functional circuit may furthermore be attached by hot stamping (application of an adhesive film under pressure and heat).

A functional circuit is here also understood to mean a fragment or a functional part of a circuit arrangement. The functional circuit may thus in particular fulfill its actual function only by connection with a further circuit and does not therefore in particular have to form a circuit arrangement on its own. The functional circuit may for example form an electrical two-pole, the electrical properties of which are dependent on the operating parameter to be detected. The formed part may in turn be produced, in particular prefabricated, from plastic using injection molding.

The formed part of the sliding element or indeed the entire sliding element is preferably made from a tribopolymer, in particular by injection molding. Tribopolymer is understood in particular to mean a polymer with additives for lubricant-free bearing mounting, in particular solid lubricants. In any event, a tribologically optimized plastic material is preferred as the material for the formed part.

In one preferred embodiment, the formed part, which defines the sliding surface in a predetermined or known geometry, is prefabricated, in particular prefabricated in one piece. The formed part may serve directly as a substrate or circuit carrier for the additively applied or printed-on functional circuit, in particular as an injection-molded circuit carrier.

It may be advantageous to provide an interlayer between the formed part and the additively printed-on or deposited functional circuit, for instance to promote adhesion or for the purpose of additional electrical insulation. Many tribopolymers have naturally relatively unfavorable adhesion properties in order to reduce static and/or sliding friction.

The trace conductor pattern or the functional circuit may be formed directly on the formed part, in particular on a surface of the formed part, or with an interposed interlayer. The trace conductor pattern or the functional circuit does not however have to be directly accessible on the surface of the finished sliding element, rather in the finished sliding element it may be partly or completely covered or for example sheathed by one or more protective layers for better protection. The protective layers or encapsulation may for example be produced by encapsulation by injection molding. In the case of a wired signal connection, an access opening to the circuit may be left free or relieved for contacting purposes or indeed a contact device may be co-encapsulated.

One advantage of the solution according to the invention is the relatively inexpensive production with a nevertheless robust construction, which is also suitable for adverse ambient conditions, such as for example use in the open air.

The formed part may comprise a thermoplastic or be made substantially of a thermoplastic. Metal compounds may also be optionally admixed with the plastic material, which is advantageous for example for the LDS production method for MIDs.

The functional circuit is preferably firmly connected to the formed part by a bonded connection. The functional circuit is preferably integrated into the formed part or is present after production as an integral component of the formed part, i.e. in particular as a component which cannot be separated non-destructively.

In a preferred further development, the functional circuit comprises at least one detection region which, for the purpose of the sensor function, is sensitive with regard to the operating parameter to be monitored.

The functional circuit preferably has at least two contact regions for the purpose of disconnectable, wired contacting of the functional circuit, in particular of the detector, with a separately constructed circuit for evaluating an electrical signal from the detector. In this way, the sliding element may be simply replaced and has very low production costs despite the sensor function. The functional circuit is preferably connected via a contact device by a disconnectable electrical connection, such as a plug-in connector or the like, with the further circuit.

One advantage of additive methods, such as for example MID methods or AM methods, consists in the fact that protruding contact regions can be produced for electrical connection in one process step together with other constituents, in particular trace conductors.

Any desired detector component or detector pattern is in principle feasible as a detection region, this preferably being produced integrally during additive manufacture of the functional circuit.

The detection region may in particular be a resistive detection region for wear detection, for example by line interruption. A simple electrical resistance measurement may in this case be used to indicate wear. Inductively or capacitively acting functional circuits for example for proximity detection, position determination or the like also lie within the scope of the invention. Other detection concepts, for example for temperature measurement or for deformation or force measurement are moreover also feasible. The term detector or detection region in particular denotes the sensing element in the sense of metrology (cf. DIN 1319-1), i.e. the part of the apparatus which responds directly to the desired measured variable or the quantity to be detected.

The detection region of the functional circuit may, at least when the sliding element is new, have a predefined distance from the sliding surface of the formed part. The detection region is generally arranged in a predefined position and in particular with the entire functional circuit in question permanently or non-detachably on the formed part.

The detection region may in particular be provided on a surface of the formed part opposite the sliding surface, in particular integrated into the surface.

In one embodiment, the detection region may extend at least in part along a wear limit to be detected, such that exceeding of the wear limit is detectable by the functional circuit.

For maximally extensive detection on the sliding element, provision may additionally or alternatively be made for the functional circuit, in particular the detection region, to extend over at least a majority of the circumferential angle or of the axial length of the sliding surface of the sliding element, depending on whether it is an axial and/or radial bearing.

Additive manufacture of the functional circuit may be simplified if the formed part has on one surface a recessed pattern, in which the finished functional circuit is at least partly or preferably fully inserted or let in. Through utilization of a recessed pattern producible with low tolerances for example by injection molding, inaccuracies of additive manufacture, for example caused by deliquescence of the not yet hardened conductor material may be reduced or compensated. Particularly preferably, the recessed pattern is provided in the prefabricated formed part opposite the actual sliding surface, so as not to impair existing requirements or specifications of known sliding elements. Access for additive manufacture is simplified if the recessed pattern for the functional circuit is provided on a convex surface of the formed part.

The preferred full accommodation of the functional circuit in a recessed pattern offers among other things the advantage that a sliding element with additional sensor function furthermore remains downwardly compatible with regard to the component geometry of an existing or already mass-produced sliding element.

The recessed pattern may remain open to the outside after additive manufacture of the functional circuit, or be subsequently encapsulated or sheathed for better protection against environmental influences, optionally in the course of additive manufacture.

In an exemplary embodiment which is particularly suitable for wear detection, the recessed pattern comprises an indentation which is arranged at least in places at a distance from the actual sliding surface in such a way that the profile of the indentation corresponds to a wear limit to be detected. The distance may correspond to a degree of wear to be detected of the sliding element. The functional circuit, in particular the detection region, is arranged preferably at least in part within an indentation on the surface of the formed part.

The functional circuit is preferably deposited directly and/or integrally onto the prefabricated formed part, for example by a MID method. The functional circuit is thus preferably bonded to the formed part.

The functional circuit is preferably made from a material which has a distinctly higher conductivity than the plastic material of the formed part, in particular from a material with a silver, copper and/or carbon content. The functional circuit may thus be deposited directly on the formed part, even without additional insulating layers between the body of the formed part and the trace conductor pattern of the functional circuit.

Various materials are already known for producing electrically conductive patterns in the course of additive manufacture. For example conducting varnishes or other printable pastes, liquids or thermoplastics with a silver content, copper content and/or carbon content (for example graphite or carbon black (CB)) may be used. A silver-based conductive paste is preferably used, such as for example a liquid resin with silver powder, such as for example DuPont® 5064H (see data sheet MCM5064H/2011). Other mixtures of a polymer matrix with conductive particles, in particular less costly carbon particles (graphite or CB) are also feasible, provided the finished material of the trace conductors of the functional circuit has a distinctly higher conductivity than the plastic material or tribopolymer of the formed part.

In one preferred embodiment, the trace conductor pattern comprises trace conductors which are additively applied for example using an AM method and which have a first layer thickness, preferably a first layer thickness of ≤200 µm, particularly preferably of ≤100 µm, for example in the range of approx. 5-50 µm, in the case of a conductor width of 0.5-5 mm; and special contact regions for disconnectable contacting. The contact regions have a second layer thickness which is markedly greater than the first layer thickness, in particular a second layer thickness of ≥200 µm, for example in the range of 250-500µm. The term layer thickness, optionally subject to tolerance, here denotes the material thickness of the conductor trace(s) or contact regions in the plane perpendicular to the length or width extent thereof. In this case, the trace conductors and contact regions are preferably applied, in particular additively applied, to the plastic formed part in one and the same manufacturing process.

Alternatively or in addition, protruding conductive contact means, for example contact pins, contact sockets or the like may be provided on the sliding element for contacting purposes. The contact means, for example in the case of additive application, may be connected with the trace conductor pattern and allow disconnectable electrical contacting from outside, for example using plug connectors. The integration of contact means is preferably combined with sheathing, which may at the same time mechanically fasten the contact means. In conjunction with such contact means, full encapsulation of the applied trace conductor pattern may also be achieved.

The additively manufactured functional circuit is preferably purely passive, i.e. is embodied without its own energy source. It may in particular take the form of a two-pole, which may be connected to a separate evaluation circuit via the contact regions. The functional circuit may in particular consist solely of trace conductors and the contact regions or be embodied without discrete electrical or electronic components. This particularly simple design for example enables resistive wear detection, in particular by resistive monitoring of an interruption of the trace conductor pattern in the functional circuit.

In the course of additive manufacture, however, other types of detectors or sensors in the sense of measured variable sensing elements may also be produced. Thus, for example, a capacitive or thermally sensitive sensor pattern may be additively applied. Piezo-resistive structures have also already been described in recent specialist literature relating to AM methods. A piezo-resistive detector which can be produced using AM methods was described for example by Leigh S J, Bradley R J, et al. ("A Simple, Low-Cost Conductive Composite Material for 3D Printing of Electronic sensors"; PLoS ONE 7(11); 2012).

The combination of plain bearing parts produced in known ways, in particular injection molded parts, with additive manufacture or direct printing of electrical circuits proves particularly advantageous if the molded part is prefabricated from a tribopolymer. Tribopolymers for lubricant-free bearing mounting are known per se and typically comprise a base polymer and microscopic solid lubricants. Furthermore, the tribopolymer may comprise reinforcing fibers and/or reinforcing fillers or other fillers. A suitable material is for example a tribopolymer from the Iglidur® product range from igus GmbH, D-51147 Cologne. This type of sliding element is intended to be exposed to a degree of wear of the base polymer which is designed to release the solid lubricant particles for solid lubrication with the bearing partner. Accordingly, wear detection is here particularly advantageous which can conveniently be implemented during additive manufacturing.

In a further embodiment, the sliding element may have sheathing for stabilization of the formed part. This sheathing may be applied to the formed part of plastic material on which the trace conductor pattern is formed. The sheathing may in particular be produced by injection molding a further plastic material around the formed part and the trace conductor pattern, such that at the same time an outer protective layer arises on the sliding element for the functional circuit. The material of the sheathing may in this case preferably comprise a high strength plastic material, which has a higher mechanical strength than the plastic material of the formed part which provides the sliding surface. The plastic material of the sheathing is preferably fiber-reinforced, in particular with a markedly greater fiber content than the plastic material of the sliding element or of the formed part. Sliding elements with stabilizing sheathing are advantageous in particular for the bearing mounting of heavy loads. The sheathing preferably covers at least the majority of the outside of the formed part, optionally with one or more recesses for example for contacting.

A plastic sliding element with sensor function according to one of the above exemplary embodiments is especially suitable for plain bearings for lubricant-free bearing, for example for linear plain bearings, radial plain bearings, axial plain bearings and/or radial/axial plain bearings.

The plain bearing may in this case have at least one such sliding element on a first bearing part. This serves in mobile guidance relative to a second bearing part in a construction known per se for plain bearings. The bearing part with the sliding element(s) may in this case constitute either the mounted bearing part or the mounting bearing part (mechanical frame). This is immaterial for the invention. The proposed sliding elements may likewise be used, from a mechanical standpoint, for any desired bearing types, for example radial bearings, axial bearings or combined axial/radial bearings etc.

In one preferred further development of the plain bearing as a whole, an evaluation circuit is provided on the first bearing part, spatially separately from the sliding element, optionally also from the plain bearing, with which evaluation circuit the functional circuit of the sliding element is releasably or replaceably connected via a line for signal transmission. To this end, a specific contact interface may for example be provided between evaluation circuit and functional circuit.

A corresponding contact device, which is connected to the evaluation circuit via a line, may for example be provided on a housing part of the first bearing part which holds the at least one sliding element.

The housing part may have a hole or an opening, bore or the like, which leads from a surface of the housing part to the sliding element held therein, such that the contact regions of the trace conductor pattern may be contacted and may be connected in wired manner to the evaluation circuit via a line.

The contact device may in particular have spring-loaded contact pins for disconnectable contacting between the evaluation circuit and the functional circuit, in particular the contact regions thereof, in order to simplify sliding element replacement. By way of an interface for disconnectable contacting with the sliding element(s), the more complex or expensive components may, during production, be arranged separately from the sliding elements on a non-wear-susceptible part of the plain bearing.

The contact device may furthermore be embodied for positional securing of the sliding element, for example for axial and/or radial positional securing of the sliding element. This may in particular be achieved by suitable housing configuration, such that mechanical locking proceeds at the same time as the electrical contacting.

Depending on the plain bearing application, the first bearing part may for example be embodied as a bearing housing or bearing carriage. The first bearing part may however also for example be a bearing receptacle for a sliding element embodied as a bearing bush.

A module comprising the evaluation circuit and a power supply, for example a battery for the evaluation circuit, may be attached to the first bearing part.

In one further development, in particular for linear guides, provision is made for the first bearing part with the evaluation circuit to comprise a plurality of sliding elements with respective functional circuits. Each of the sliding elements may be electrically connected replaceably or releasably with the evaluation circuit, such that a plurality of sliding elements are monitored with the same evaluation circuit. The evaluation circuit evaluates at least one operating parameter, for example the state or electrical resistance of a single conductor loop as functional circuit. According to WO 2017/182662 A1, it is for example possible to obtain valuable information about the operating state of the plain bearing or sliding element for example by monitoring wear-induced conductor interruption.

The evaluation circuit may furthermore comprise a communication module, in particular a radio communication module, which is set up to transmit an evaluation result to a higher-level monitoring system. To this end, any desired wired or wireless technologies may be used for data transmission.

The proposed sliding element or plain bearing is suitable in particular for use in a lubricant-free linear guide system, but also for a plurality of other plain bearings, for example for plain bearing bushes for lubricant free radial bearing mounting.

BRIEF DESCRIPTION OF THE DRAWINGS

Further details, features and advantages are revealed, without limiting the general nature of the above teaching, by the following description of preferred exemplary embodiments on the basis of the appended figures, in which:

FIGS. 4A-4C are views of a plastic sliding element according to a second exemplary embodiment with integrated electrical functional circuit, here for a radial bearing, in longitudinal section (FIG. 4A), in front view (FIG. 4B) and partially magnified longitudinal section (FIG. 4C: corresponding to IV-C of FIG. 4A); and FIGS. 5A-5B show two functional circuits integrated in a plastic formed part for a radial bearing, for example according to FIGS. 4A-4C, in each case in perspective view.

DETAILED DESCRIPTION

Figure 1A:
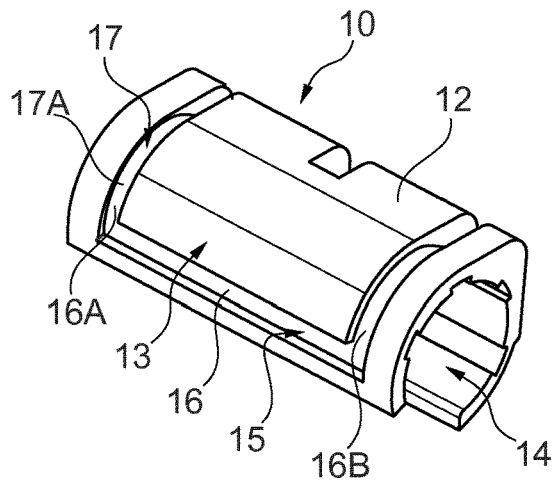
FIGS. 1A-1B are perspective views of a plastic sliding element with an electrical functional circuit with sensor function for detecting an operating parameter.
Figure 1B:
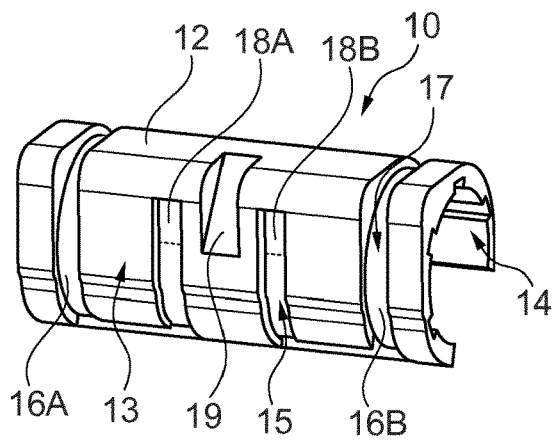

The sliding element shown purely by way of example in FIGS. 1A-1B, and denoted 10 overall, comprises as its main constituent a formed part 12 prefabricated by injection molding from a tribopolymer, e.g. from a tribopolymer of the Iglidur® type from igus GmbH, D-51147 Cologne. The formed part 12 forms an internal sliding surface 14 for mobile guidance and sliding relative bearing mounting of two bearing parts. The concave sliding surface 14 is of substantially cylindrical configuration in FIGS. 1A-1B, for example for linear sliding guidance on a profile rail with a cross-sectionally round guide profile, e.g. on a metal double rail (not shown) of the Drylin® W type from igus GmbH. Other profile cross-sections of the formed part 12 fall within the scope of the invention. The geometry and construction of the sliding element 10 relevant for guidance may for example correspond to the teaching of WO 97/40281 A1, the teaching of U.S. Pat. No. 7,217,034 B2 or DE 20 2004 016 094 U1 or indeed of DE 20 2016 101 698 U1, the relevant teaching of which is included by reference herein for the sake of brevity.

A recessed pattern 15 is prefabricated by injection molding on the outer surface 13 of the sliding element 10 opposite the sliding surface 14. The recessed pattern 15 forms a contiguous indentation relative to the outer surface 13 with a here constant depth with regard to the contour or envelope curve of the outer surface 13. The base point or bottom of the recessed pattern 15 lies at a constant distance from the opposing sliding surface 14. The predetermined depth corresponds to a nominal wear limit relative to the wearing sliding surface 14, on arrival at which the sliding element 10 should be replaced. The desired depth may be accurately established during the injection molding process. Reference is made for example to the teaching of WO 2017/182662 A1 with regard to the wear limit. The cross-section of the recessed pattern 15 may be oblong or square, for example with a side length of approximately 0.5-1 mm.

An electrical functional circuit 16 is introduced into the recessed pattern 15 on the convex outer surface 13 and here completely fills up or occupies the bottom of the recessed pattern 15. The recessed pattern 15 and thus the functional circuit 16 extend in the example of FIGS. 1A-1B in a plurality of meandering or U-shaped loops and over the majority of the effective circumferential angle and also of the effective axial length of the sliding surface 14 with in particular two terminal annular portions 16A, 16B, which correspond apart from a marginal zone to the overall circumference of the sliding surface 14. The selected topology of the recessed pattern 15 or functional circuit 16 is intended to achieve maximum cover of sub-regions of the sliding surface 14 which experience has shown are critical with regard to wear, for all installation positions, something which is typically dependent on the type of sliding element 10 and the application thereof.

Figure 2A:
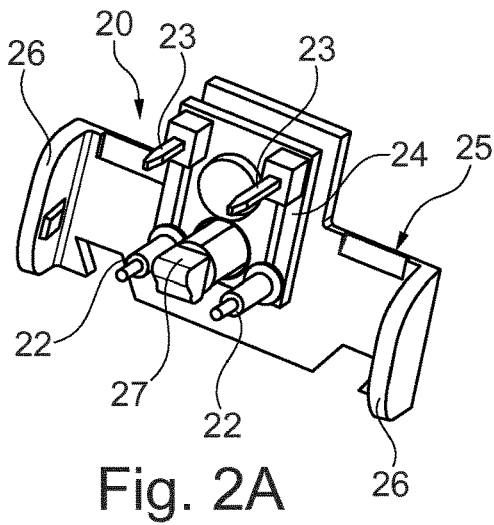
FIGS. 2A-2B are perspective views of a contact device for disconnectable contacting of the functional circuit on the sliding element according to FIGS. 1A-1B.
Figure 2B:
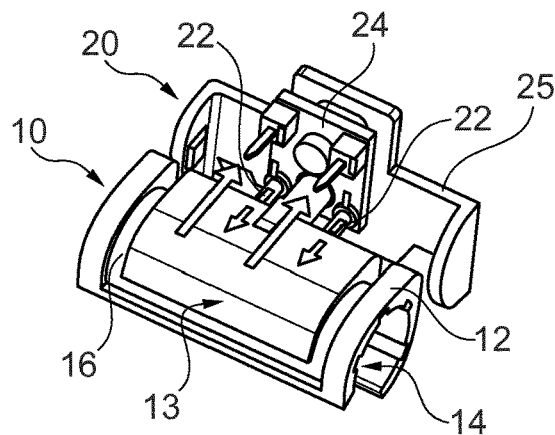
Figure 3:
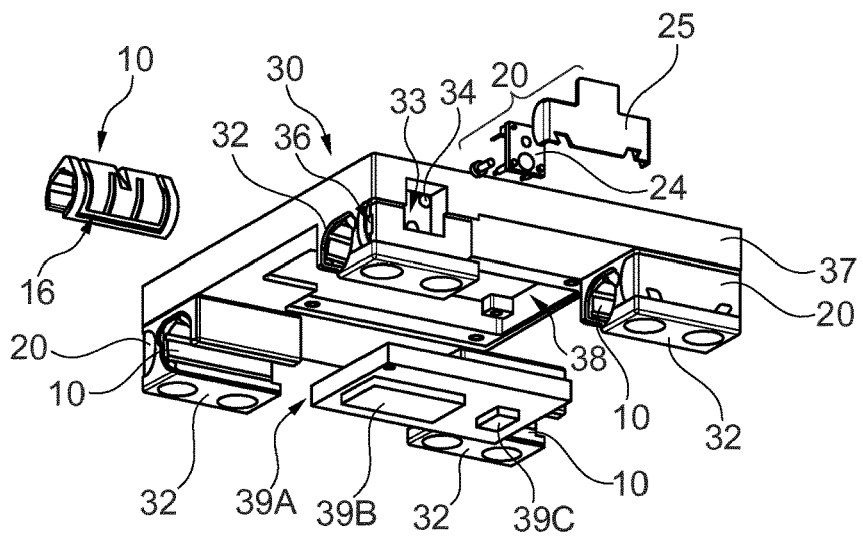
FIG. 3 is a perspective view of a bearing carriage for a linear guide with a plurality of sliding elements according to FIGS. 1A-1B and contact devices according to FIGS. 2A-2B, and a module with an evaluation circuit and a power supply, in partially exploded representation.

In the exemplary embodiment according to FIGS. 1-3, the functional circuit 16 is intended to detect as an operating parameter progressive wear, which reduces the useful wall thickness of the sliding element 10. To this end, the functional circuit 16 here consists merely of the meanderingly arranged conductor loop, which serves as a wear-sensitive detector 17 for detecting a wear-induced interruption of the conductor loop, and two contact regions 18A, 18B at the open ends of this conductor loop. The contact regions 18A, 18B serve for replaceable contacting, as explained below in relation to FIGS. 2A-2B. The functional circuit 16 is thus purely passive, has no protruding electrical components (resistors, capacitors, coils) and may thus be produced at low manufacturing cost.

According to the invention, the functional circuit 16 is applied using a suitable technique directly onto the formed part 12 within the recessed pattern 15, for example using MID technology or using direct printing or a suitable AM method, for example an EB method. The functional circuit 16, that is here the conductor loop of trace conductors 17A or the detector 17 and the contact regions 18A, 18B may thus be deposited directly and integrally in one process step. The conductive structures of the functional circuit 16 may for example be produced from suitable printable silver paste or a thermoplastic with a suitable carbon content. After hardening, the detector pattern 17 or trace conductor 17A is intended to have a conductivity which is many times higher than that of the tribopolymer of the formed part 12. If necessary, an adhesion promoter may initially be deposited onto the bottom of the recessed pattern 15, likewise using appropriate printing or AM technology.

For reliable contacting, the contact regions 18A, 18B should have a greater film thickness, approximately in the range from 250-400 µm, compared with approximately 5-50 µm for the other trace conductors 17A of the trace conductor topology of the detector 17. The conductor width of the trace conductor(s) 17A, which form the detector 17, corresponds to the predefined width of the recessed pattern 15, for example approximately 500 µm up to a few millimeters, depending on the dimensions of the sliding element 10.

FIGS. 2A-2B show a contact device 20 which simplifies replacement of the sliding element 10. The contact device 20 comprises two spring-loaded contact pins or compression spring contacts 22 for electrical contacting of the terminal contact regions 18A, 18B of the functional circuit 16 on the sliding element 10 (shown by arrows in FIG. 2B). The spring-loaded contact pins 22 are attached with additional plug pins 23 to a printed circuit board 24 and in each case connected conductively therewith. The plug pins 23 serve for plug connection with connecting lines of an evaluation circuit 39B (FIG. 3). The printed circuit board 24 is fastened to a lid-like holder 25, which is produced as an injection-molded part and has two retaining arms 26 for fastening. The holder 25 further comprises a securing bolt 27 which engages in a securing slot 19 on the sliding element 10 (cf. FIG. 1B and FIG. 2B) for axial positional securing of the sliding element 10.

FIG. 3 shows a guide carriage 30 as the mounted bearing part of a linear guide system with for example four structurally identical sliding elements 10 according to FIGS. 1A-1B for plain bearing mounting on a double-profile rail. It is optionally also possible to use just one sliding element 10 according to FIGS. 1A-1B serving as an indicator, with three conventional sliding elements. The sliding elements 10 are in each case accommodated in a separate housing bearing 32, which is attached at the corner on a carriage plate 37 of the guide carriage 30. The carriage plate 37 serves for fitting on the machine part to be guided. At least one or more sliding elements 10 have a functional circuit 16 (FIGS. 1A-1B) which is electrically contacted by means of an associated contact device 20 (FIGS. 2A-2B). The contact devices 20 are arranged in corresponding receptacles 33 and tool-lessly lockable by means of the retaining arms 26 with end-side latching openings 36 of the respective housing bearing 32. Line ducts 34 with sockets are incorporated into or provided in the carriage plate 37 for each receptacle 33, a respective connecting line for the corresponding functional circuit 16 being guided in the line ducts. Contacting of the compression spring contacts 22 and plug pins 23 proceeds on latching of the contact device 20.

A receptacle 38 is provided on the bottom of the guide carriage 30, in which receptacle an electronic module 39A is provided for connection of the functional circuits 16 via the respective contact devices 20. The module 39A comprises a common evaluation circuit 39B, for example with a microprocessor, and a battery 39C for power supply. By means of the contact devices 20, the sliding elements 10 may be readily replaced when they reach the end of their service life, in particular without interference with the module 39A.

The evaluation circuit 39B in this case monitors at least the wear state of the sliding elements 10 via the connected functional circuits 16. If the abrasion of a sliding element 10 reaches the predetermined wear limit, the detector pattern 17 is severed or the resistance thereof increased. The evaluation circuit 39B detects whether the circuit arrangement formed with the functional circuits 16 is interrupted or the electrical resistance is increasing sharply and thereby identifies that the wear limit has been reached.

The evaluation circuit 39B may additionally detect further operating parameters of the plain bearing such as for example acceleration, temperature and humidity values. The evaluation circuit 39B comprises a communication module (not shown separately) for data transfer of sensor data or evaluation results to a higher-level monitoring system, for example via a suitable radio communication protocol. With regard to suitable communication technology, reference is made, for the sake of brevity, for example to the teaching of WO 2018/115528 A1, in particular to FIGS. 8-9 therein.

The design of the plain bearing and thus of the plastic sliding element is in principle immaterial. Sliding elements with integrated sensor systems according to the invention are particularly advantageous in applications with heavy loading, i.e. severe wear, and/or in which predictive or state-oriented maintenance is desirable.

FIG. 4A-4C show as a further exemplary embodiment a sliding element 40 for a radial bearing, here embodied as a plain bearing bush. The sliding element 40 comprises as main constituent a formed part 42 which is prefabricated by injection molding from a tribopolymer, for example of the Iglidur® type from igus GmbH, D-51147 Cologne.

The formed part 42 forms an internal circular cylindrical sliding surface 44A, symmetrical relative to the axis A and closed therearound, for lubricant-free radial bearing mounting of a component which is not shown, for example a rotatable metal shaft. With regard to the latter, the tribopolymer of the formed part 42 is selected to be suitable for low coefficients of friction, depending on the desired bearing pairing or tribological pairing. The one-piece sliding element 40 here has, as an optional extra constituent, a reinforcing outer jacket 43 of another, preferably stronger plastic material, which is provided on the external surface 44B of the formed part 42 by encapsulation by injection molding of the prefabricated formed part 42. In FIGS. 4A-4C the outer jacket 43 completely surrounds the axis A, and may optionally also engage around the axial end faces of the formed part 42 (not shown here). The outer jacket 43 may be made from high strength plastic material and form mechanical rigidity- or strength-increasing sheathing, for example for heavy loads >100 MPa. The outer jacket 43 is bonded to the formed part 42 or connected inseparably therewith to yield one part or in one piece therewith. The sliding element 40 may be produced for example using the multicomponent method.

In FIGS. 4A-4C the sliding element 40 is embodied overall substantially cylindrically and in one piece with the inner formed part 42 and the outer jacket 43. The sliding element 40 is inserted, for example fitted or pressed in, as a mounting component in a matching receptacle in a bearing part 41 (frame). The bearing part 41 in FIGS. 4A-4C is shown only in part and purely diagrammatically as a cuboid.

The formed part 42 has a recessed pattern 45 at the surface 44B opposite the concave sliding surface 44A, which is prefabricated as a contiguous indentation in the convex surface 44B. In line with the principle of FIGS. 1-3, an electrical functional circuit 46 is also introduced into the recessed pattern 45 in FIGS. 4A-4C, which circuit consists of a pattern of trace conductors 47A and for example completely covers or fills the bottom of the recessed pattern 45. The functional circuit 46 extends such that the pattern 47 of trace conductors 47A forms a detector for indicating wear and detects at least the regions of the formed part 42 known empirically to be critical, for example in loops over substantially the entire effective circumferential angle about the axis A and/or the entire effective axial length of the sliding surface 44A. The trace conductors 47A are here formed at the external surface of the formed part 42, which serves as a carrier.

The base point or bottom of the recessed pattern 45 lies at a constant distance from the opposing sliding surface 44A, which corresponds to a first nominal wear threshold W1, which can be relatively precisely established by injection molding in the case of the prefabricated formed part 42. As wear of the sliding surface 44A increases beyond the predefined wear threshold W1, the sliding element 40 should be replaced, but remains functional at least up to the second wear threshold W2 (FIG. 4C). The cross-section of the recessed pattern 45 may for example be oblong or square, for example with a side length of approx. 0.5-1 mm, as shown in FIG. 4C.

The outer jacket 43 according to FIGS. 4A-4C serves simultaneously as protection for the functional circuit 46 and as a mechanical abutment for the trace conductor pattern 47 in a radially outward direction, such that the latter cannot inter alia become unintentionally detached from the formed part 42.

FIGS. 5A-5B show suitable profiles, depending on loading, of trace conductor patterns 47 or 57 on the formed part 42 or 52 respectively, here without optional, preferred sheathing. The sliding element 40 of FIG. 5A corresponds to FIGS. 4A-4C and shows a trace conductor pattern 47 with predominantly circumferential profile about the axis A, i.e. in FIG. 5A the direction components of the trace conductor pattern 47 predominantly surround the axis A (in each case from a vector viewpoint). The detector or the trace conductor pattern 47 of FIGS. 4A-4C has, as shown in FIG. 5A, an inwardly deflected or nested conductor loop which forms a two-pole based on two optionally reinforced contact regions 48A, 48B for wired contacting, as in FIGS. 1A-1B.

FIG. 5B shows an alternative profile of a trace conductor pattern 57, namely meandering predominantly axially in the direction of axis A, but also extending over the entire circumference. The trace conductor pattern 57 also forms a two-pole based on contact regions 58A, 58B. Geometries other than those shown are suitable and possible, depending on main load, for example approximately sinusoidal (when viewed in development of the circumferential surface), circumferential in the form of a single ring, etc.

The trace conductor pattern 47; 57 applied to the formed part 42; 52 of the sliding element 40; 50 serves in each case as a detector or indicator for exceeding of the wear limit W1 when in operation. As wear of the sliding element 40; 50 progresses, at least one of the trace conductors 47A, 57A becomes worn or damaged by abrasion, i.e. the electrical resistance increases measurably. This may be simply detected signal-wise as in FIGS. 1-3, for instance by measuring voltage, current, resistance or conductivity, for example by an evaluation circuit (cf. FIG. 3, 39B), which accordingly switches a signal or outputs a message which indicates that the sliding element 40; 50 should be replaced. In this case, first of all a reduction occurring in the resistance of the functional circuit 46 may indicate that the wear limit W1 has been reached and an interruption in the trace conductor pattern 47 may indicate that wear limit W2 has been reached.

As a result of a radial passage opening 49A in the outer jacket 43 and an aligned passage opening 49B in the bearing part 41, for example a bore, the contact regions 48A, 48B and 58A, 58B respectively are accessible from outside. The wired, disconnectable connection or contacting with the contact regions 48A, 48B or 58A, 58B respectively for signal tapping is produced by the passage openings 49A, 49B. To this end, a suitable contact device similar to FIGS. 2A-2B, but with two spring-loaded contact pins 22, is preferably inserted into the passage openings 49A, 49B, such that the sliding element 40, 50 is replaceable in the axial direction A, preferably without removal of the contact device, and contacting is automatically disconnected or re-produced. A common radial passage opening 49A for both contact regions 48A, 48B is preferably prefabricated in the outer jacket 43 and provided for instance centrally in relation to the axial structural length of the sliding element 40, 50 or of the bearing bush. The passage openings 49A, 49B preferably have the same diameter and may here also serve in axial securing together with the contact device (not shown).

The functional circuit 46 with trace conductor pattern 47; 57 and contact regions 48A, 48B and 58A, 58B respectively may be applied process-wise using various suitable processes onto the formed part 42; 52 or integrated thereinto. Automated processes, for example MID production methods, 3D printing, in-mold labeling, etc. are preferred. Encapsulation protecting part or at least the majority (passage opening 49A excepted) may then optionally take place, for example by separate encapsulation by injection molding, or indeed in the course of the 3D printing. The functional circuit 46 in FIGS. 4A-4C is purely passive. Electrical components such as resistors, capacitors, coils, ICs, etc. may also be provided to detect another operating parameter. Production using MID technology is then optionally advantageous, wherein encapsulation may also be provided by an outer jacket in one piece with the formed part. Further features of the plastic sliding elements 40; 50, in particular with regard to signal evaluation, e.g. by an evaluation circuit 39B, may correspond to FIGS. 1-3.

Alternatively or in addition to the wear-indicating sensor system, functional circuits may thus be used with a different type of detector for an operating parameter to be monitored, for example force, temperature, installation position or relative position etc.

The invention enables, as intended, monitoring of the state of sliding elements or plain bearings equipped therewith and thus for example helps to prevent unplanned failures, make optimum use of the service life of the sliding elements and/or reduce maintenance costs.

LIST OF REFERENCE SIGNS

FIGS. 1A-1B
10 Sliding element
12 Formed part
13 Outer surface
14 Sliding surface
15 Recessed pattern
16 Functional circuit
16A, 16B Annular portion
17 Detector (trace conductor pattern)
17A Trace conductor
18A, 18B Contact regions
19 Securing slot
FIGS. 2A-2B
10 Sliding element
12 Formed part
13 Outer surface
14 Sliding surface
16 Functional circuit
20 Contact device
22 Spring-loaded contact pin/compression spring contact
23 Plug pin
24 Printed circuit board
25 Holder
26 Retaining arms
27 Securing bolt
FIG. 3
10 Sliding element
16 Functional circuit
20 Contact device
30 Guide carriage
32 Housing bearing (for sliding element)
33 Receptacle (for contact device)
34 Line duct
36 Latching opening
37 Carriage plate
38 Receptacle (for module 39A)
39A Module
39B Evaluation circuit
39C Battery
FIGS. 4A-4C; FIG. 5A
40 Sliding element
41 Bearing part
42 Formed part
43 Outer jacket
44A Sliding surface
44B Outer surface
45 Recessed pattern
46 Functional circuit
47 Trace conductor pattern (here detector)
47A Trace conductor
48A, 48B Contact regions
49A, 49B Passage opening
A Bearing axis
W1, W2 Wear limit
FIG. 5B
50 Sliding element
52 Formed part
57 Trace conductor pattern (here detector)
57A Trace conductor
58A, 58B Contact regions

What is claimed is:

1. A plastic sliding element for a lubricant-free plain bearing, wherein the sliding element comprises a formed part made of plastic, made by injection molding, which has a sliding surface for mobile guidance of two bearing parts relative to one another, wherein an electrical functional circuit having a sensor function is arranged on the formed part for acquisition of an operating parameter, wherein:
the functional circuit comprises at least one trace conductor pattern, wherein the at least one trace conductor pattern is formed on the formed part, the formed part serving as a carrier of the trace conductor pattern, wherein the functional circuit is applied on the prefabricated formed part of plastic by an additive manufacturing method (AM method).

2. The sliding element as claimed in claim 1, wherein the formed part is prefabricated from a tribopolymer.

3. The sliding element as claimed in claim 1, wherein the functional circuit comprises a detection region sensitive with regard to the operating parameter.

4. The sliding element as claimed in claim 3, wherein the detection region has, when the sliding element is new, a predefined distance from the sliding surface and/or is provided on a surface of the formed part opposite the sliding surface.

5. The sliding element as claimed in claim 3, wherein the detection region extends at least in part along a wear limit to be detected, such that exceeding of the wear limit is detectable by the functional circuit, and/or the detection region extends over at least a majority of a circumferential angle or of an axial length of the sliding surface.

6. The sliding element as claimed in claim 1, wherein the formed part has a recessed pattern on one surface, opposite the sliding surface, in which recessed pattern the functional circuit lies at least partly or fully, wherein the one surface is of convex configuration.

7. The sliding element as claimed in claim 6, wherein the recessed pattern comprises a recessed portion which extends at a distance from the sliding surface which corresponds to a degree of wear of the sliding element to be detected.

8. The sliding element according to claim 1, wherein the trace conductor pattern is directly and integrally deposited onto the prefabricated formed part and is bonded to the formed part by a substance-to-substance bond.

9. The sliding element according to claim 8, wherein the trace conductor pattern is deposited onto the prefabricated formed part by a molded interconnect device method or an extrusion-based method.

10. The sliding element as claimed in claim 1, wherein the trace conductor pattern is made from a material which has a higher conductivity than the plastic material of the formed part.

11. The sliding element as claimed in claim 1, wherein the trace conductor pattern comprises trace conductors, which have a first layer thickness of ≤100 μm; and contact regions, which have a second layer thickness of ≥200μm.

12. The sliding element as claimed in claim 1, wherein the functional circuit is of passive configuration and consists of trace conductors and contact regions and/or serves for resistive wear detection by conductor interruption.

13. The sliding element as claimed in claim 1, wherein the formed part comprises a tribopolymer which has a base polymer and solid lubricants.

14. The sliding element as claimed in claim 1, wherein the sliding element has a sheathing for stabilization of the formed part which is applied onto the formed part of plastic on which the trace conductor pattern is formed.

15. A plain bearing having a first bearing part and a second bearing part, wherein the first bearing part comprises at least one sliding element as claimed in claim 1, which serves for mobile guidance of the second bearing part relative to the first bearing part, wherein on the first bearing part an evaluation circuit is provided which is releasably connected with the functional circuit on the at least one sliding element.

16. The plain bearing as claimed in claim 15, wherein the first bearing part has on a housing part holding the at least one sliding element a contact device connected to the evaluation circuit for releasable contacting of the evaluation circuit with the functional circuit.

17. The plain bearing as claimed in claim 16, wherein the contact device has a holder for positional securing of the sliding element.

18. The plain bearing as claimed in claim 15, wherein the first bearing part is formed as a bearing housing, a carriage, or a bearing bush and comprises a module attached thereto with the evaluation circuit and with a power supply.

19. The plain bearing as claimed in claim 15, wherein the at least one sliding element of the first bearing part includes two sliding elements, wherein the respective functional circuits of both sliding elements are releasably connected with the evaluation circuit for signal transmission.

20. The plain bearing as claimed in claim 15, wherein the evaluation circuit evaluates at least one operating parameter on the basis of the functional circuit and comprises a communication module which is set up to transmit an evaluation result to a higher-level monitoring system.

\* \* \* \* \*